(12) United States Patent
    Hartwich et al.

(10) Patent No.: US 8,320,437 B2
(45) Date of Patent: *Nov. 27, 2012

(54) METHOD AND DEVICE FOR DECODING A SIGNAL

(75) Inventors: Florian Hartwich, Reutlingen (DE); Andreas-Juergen Rohatschek, Wernau/Neckar (DE); Eberhard Boehl, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 740 days.

This patent is subject to a terminal disclaimer.

(21) Appl. No.: 11/919,595

(22) PCT Filed: Apr. 13, 2006

(86) PCT No.: PCT/EP2006/061576
    § 371 (c)(1),
    (2), (4) Date: Nov. 10, 2009

(87) PCT Pub. No.: WO2006/114370
    PCT Pub. Date: Nov. 2, 2006

(65) Prior Publication Data
    US 2010/0046594 A1    Feb. 25, 2010

(30) Foreign Application Priority Data

Apr. 27, 2005 (DE) .......................... 10 2005 019 913
Dec. 20, 2005 (DE) .......................... 10 2005 060 903

(51) Int. Cl.
    *H04B 3/46* (2006.01)
(52) U.S. Cl. ........ 375/226; 375/316; 375/340; 375/342; 375/354; 375/355; 375/360; 375/365; 375/366; 375/368; 370/509; 370/510; 327/141; 455/502; 714/707

(58) Field of Classification Search .................. 375/316, 375/340, 342, 354, 355, 360, 365, 366, 368; 375/226; 370/509, 510; 327/141; 455/502; 714/707
See application file for complete search history.

(56) References Cited

U.S. PATENT DOCUMENTS

| | | | |
|---|---|---|---|
| 7,469,354 B2* | 12/2008 | Minzoni et al. | 713/503 |
| 7,864,078 B2* | 1/2011 | Rohatschek | 341/51 |
| 2005/0102545 A1* | 5/2005 | Clavequin et al. | 713/401 |
| 2005/0207280 A1* | 9/2005 | Fowler et al. | 368/10 |

FOREIGN PATENT DOCUMENTS

| | | |
|---|---|---|
| DE | 35 46 684 | 3/1991 |
| DE | 101 20 360 | 11/2002 |
| DE | 10 2005 060 903 | 11/2006 |
| WO | WO 96/26607 | 8/1996 |

OTHER PUBLICATIONS

International Search Report, PCT International Patent Application No. PCT/EP2006/061576, dated Aug. 7, 2006.

* cited by examiner

*Primary Examiner* — Leon Flores
(74) *Attorney, Agent, or Firm* — Kenyon & Kenyon LLP (57) ABSTRACT

In a method and a device for decoding a signal, the signal is transmitted via at least one connecting line of a data transmission system, in a user of the data transmission system receiving the signal. It is provided to measure the interval of a change—provided compulsorily in a transmission protocol used in the data transmission system—of the signal from rising to falling or from falling to rising edge. A tendency for an asymmetrical delay of the signal can be ascertained from the measured interval. The sampling of the bits of the received signal can be improved as a function of the interval or of the asymmetrical delay, for example, by setting the sampling instant in variable fashion. Alternatively, the interval or the asymmetrical delay can be utilized for diagnostic purposes.

15 Claims, 9 Drawing Sheets

METHOD AND DEVICE FOR DECODING A SIGNAL

FIELD OF THE INVENTION

The present invention relates to a method for decoding a signal, which is transmitted via at least one connecting line of a data transmission system, in a user of the data transmission system receiving the signal. The invention further relates to a system for transmitting a signal. In addition, the present invention relates to a user of a data transmission system. Finally, the present invention also relates to a communication controller of a user of a data transmission system.

BACKGROUND INFORMATION

The networking of control units, sensor systems and actuator systems with the aid of a communication system or data transmission system and a communication link, e.g., in the form of a bus system, has increased dramatically in recent years in modern motor vehicles, but also in other sectors, for example, in machine construction, especially in the field of machine tools, and in automation. In this context, synergistic effects may be achieved by the distribution of functions to a plurality of users, e.g., control units, of the communication system. These are called distributed systems.

Increasingly, the communication between various users of such a data transmission system is taking place via a bus system. Communication traffic on the bus system, access and receive mechanisms, as well as error handling are regulated by a protocol. For instance, one known protocol is the FlexRay protocol, presently based on the FlexRay protocol specification v2.1. FlexRay is a rapid, deterministic and fault-tolerant bus system, particularly for use in motor vehicles. The FlexRay protocol operates according to the principle of Time Division Multiple Access (TDMA), in which the users or the messages to be transmitted are assigned fixed time slots in which they have exclusive access to the communication link. The time slots repeat in a fixed cycle, so that the instant at which a message is transmitted via the bus can be predicted exactly, and the bus access takes place deterministically.

To optimally utilize the bandwidth for the transmission of messages on the bus system, FlexRay subdivides the cycle into a static and a dynamic part, that is, into a static and a dynamic segment. The fixed time slots are in the static part at the beginning of a bus cycle. In the dynamic part, the time slots are preset dynamically. Therein, the exclusive bus access is now in each case only permitted for a brief time, for the duration of at least one so-called minislot. Only if a bus access takes place within a minislot is the time slot lengthened by the time necessary for the access. Consequently, bandwidth is thus only used up if it is also actually needed. FlexRay communicates via one or two physically separate lines with a data rate in each instance of 10 Mbit/sec. maximum. However, FlexRay can, of course, be operated with lower data rates as well. The two channels correspond to the physical layer, in particular of the so-called OSI (open system architecture) layer model. They are used chiefly for the redundant and therefore fault-tolerant transmission of messages, but can also transmit different messages, which means the data rate could then double. It is also conceivable that the signal transmitted via the connecting lines results from the difference of signals transmitted via the two lines. The physical layer is developed in such a way that it permits an electrical, but also optical transmission of the signal or signals via the line(s) or a transmission in another way.

To realize synchronous functions and to optimize the bandwidth by small intervals between two messages, the users in the communication network need a common time base, the so-called global time. To synchronize local clocks of the users, synchronization messages are transmitted in the static part of the cycle, the local clock time of a user being corrected with the aid of a special algorithm corresponding to the FlexRay specification, so that all local clocks run in synchronization with a global clock.

In transmitting data or messages via such a bus system, pulses become distorted because high-to-low or low-to-high edges on the transmission path are delayed by different amounts. If the transmitted pulse is sampled a multiple number of times (for example, n times per bit) in the receiver with the sample clock (the so-called sampling rate) existing there, then the position of the sampling point, i.e., the selection of exactly one of these n sampling values, decides whether the datum is sampled correctly or incorrectly. This is particularly difficult when the sampling instant refers to one edge of the signal, and relative thereto, a plurality of binary data values (bits) from the transmitter are also evaluated over many periods of the sample clock. In addition to a pulse distortion, the clock-frequency deviation between transmitter and receiver has an effect here as well. In this context, the signal to be sampled may be preconditioned in order, for example, to filter out short-duration interferences. Such a filter may then be implemented by evaluating a plurality of sampled signals in the time sequence with a majority decision (so-called voting). Particularly in the case of the FlexRay protocol specification in which, given n network nodes, there can be $$2\sum_{i=0}^{n-1} i$$

different transmission paths (each conceivable path has 2 transmitter-receiver combinations), it has turned out that the fixed determination of the sampling instant without taking the asymmetrical delays on the different transmission paths into consideration leads to problems in the timing. The delay between the rising and falling edge of a signal is also known as pulse distortion or asymmetrical delay.

Asymmetrical delays may have both systematic and stochastic causes. In the FlexRay protocol, systematic delays affect only the rising edges, since synchronization is carried out to the falling edges. Stochastic delays have effects both on the rising and on the falling edges, and are caused by noise occurrences or EMC jitter.

Owing to the fixed selection of the sampling instant per bit (for example, given n sampling values per bit at n/2, in the middle of a bit), both the influence of the asymmetrical distortion as well as the frequency deviation and the additional time discretization due to the sampling are a problem, and place high demands on the transmission channel. Increasing the edge steepness in order to reduce the asymmetrical delays would indeed bring advantages for the timing, but would on the other hand require technically more demanding and thus costlier components, and in addition would unfavorably influence the EMC performance of the data transmission system. Therefore, it is sometimes more advantageous not to select the edge steepness to be so great; however, depending on the pulse distortion, one runs the risk of evaluating the wrong datum either at the one or the other bit boundary.

In addition, in the implementation of FlexRay data transmission systems, particularly in the case of complex systems including a plurality of star couplers and passive networks, it has turned out that the asymmetrical delay times occurring there are so great that they exceed a time budget predefined by the FlexRay protocol. According to the FlexRay protocol, a sample counter is synchronized with the falling BSS (byte start sequence) edge, that is, is set back to 1. Sampling is carried out at a counter reading of 5. In the case of an 8-fold oversampling as presently provided in FlexRay, between the sampling instant (5th sampling value) and the 8th sampling value, 3 sample clocks thus still remain which, given a communication controller clock pulse of 80 MHz, in each case correspond to 12.5 ns, thus in total to a time budget of 37.5 ns. This time budget is actually used for the compensation of asymmetrical delays because of the difference of falling to rising edge steepness. If, however, —as can be the case in complex network topologies—the asymmetrical delay exceeds the time budget provided, the result is that, given a sampling at the 5th sample clock (reading of the sample counter at 5), a false value is ascertained because the bit which should actually have been sampled was already present at an earlier instant due to the asymmetrical delay, and is no longer present owing to the early edge change. An analogous treatment holds true for an asymmetrical delay retarded in time. A time budget of 4 sample clocks corresponding to 50 ns is then available. If the time budget is exceeded in a manner advanced or retarded in time, decoding errors result, thus false data are received.

It may be that these decoding errors can be detected by suitable error-detection algorithms, so that it is possible to cause the bit or the entire data frame to be transmitted again. For example, a so-called parity bit or a so-called cyclic redundancy check (CRC) may be used as an error-detection algorithm. However, the disadvantage of a frequent response of the error-detection algorithm lies in the decreased availability of the data transmission system associated with it, since, for example, the incorrect data are transmitted again or are discarded.

In summary, it can be said that demands are made by the FlexRay protocol which the physical layer cannot sustain—at least in the case of complex network topologies.

SUMMARY

Example embodiments of the present invention resolve this contradiction and provide a possibility as to how data can be transmitted via the data transmission system with high transmission rate, great reliability and high availability of the data transmission system, and decoded at the receiving user.

According to example embodiments of the present invention, it is provided to measure the interval of a change—provided compulsorily in a transmission protocol used in the data transmission system—of the signal from rising to falling or from falling to rising edge.

A tendency of the asymmetrical delay, especially of the systematic component of the asymmetrical delay, may be ascertained from the measured interval. Suitable measures for improving the sampling of the bits received may be taken as a function of the measured interval or the ascertained asymmetrical delay of the transmitted signal. For example, the instant for sampling the bits received may be set in variable fashion as a function of the measured interval or the ascertained asymmetrical delay. Alternatively or in addition, the measured interval or the ascertained asymmetrical delay may be used for diagnostic purposes.

A decisive difference with respect to conventional systems and methods can be seen in that sampling is no longer carried out at a sampling instant predefined in a fixed manner, but rather at a variable sampling instant. Thus, the position of the sampling point, that is, in the case of an n-fold oversampling, the choice of one of the n sampling values, is variably selected. In this context, the selection may be made in the receiving node, e.g., as a function of the quality of the signal transmission between the transmitting and receiving user nodes, thus, as a function of the quality of the signal received. The quality of the signal transmission or of the signal may be ascertained for each link between two user nodes and stored in the users. However, it is also possible to ascertain the quality for each individual data frame transmitted. For example, the quality of the transmitted signal or of the signal transmission may be ascertained on the basis of an asymmetrical delay of the transmitted signal, and the sampling instant may be set accordingly.

Example embodiments of the present invention are described by way of example based on a FlexRay data transmission system. However, this is not to be understood as a restriction with regard to the present invention. Example embodiments of the present invention may be used for many different types of data transmission systems and may be easily transferable to comparable systems.

According to example embodiments of the present invention, a variable shift of the sampling instant as described here below, particularly in the case of FlexRay, is able to bring a time gain of at least one clock-pulse period of the sample clock compared to the fixed specification of the sampling instant provided in conventional methods. This time savings accommodates the present realization of the physical layer component according to the Electrical Physical Layer Specification Version 2.1, and due to the more favorable flexible sampling, allows the realization of the full transmission rate of 10 Mbit/sec. in topologies more complex than the pure point-to-point connection. According to example embodiments of the present invention, the constant cStrobeOffset of 5 for the position of the sampling point predefined in fixed manner in the protocol is increased or reduced as a function of the measuring results for the interval or the asymmetrical delay or the systematic component of the asymmetrical delay, or it remains the same.

By measuring the delay of a change—provided compulsorily in the protocol—of the rising and falling edge of the received signal on the active transmission path, it is possible to shift the sampling instant in targeted fashion to thereby increase the robustness of the transmission. The delay between rising and falling edge is also known as pulse distortion or asymmetrical delay. Preferably, the measurement is carried out at least once for each active data transmission path. In this context, an increase of the measured values reduces the influence of stochastic corruptions. In particular, it is also possible to continue the measurements during the data transmission and, if necessary, to correct the sampling instant in the course of the transmission. It is also possible to detect errors if contradictory sampling instants should result from multiple measurements.

With example embodiments of the present invention, it is possible to individually adapt each user receiver to the user transmitter and the data channel. This adaptation is preferably implemented for each data frame. The transmission becomes more robust due to the adaptation of the sampling instant. Example embodiments of the present invention are particularly simple to realize, because it may be that no additional hardware is needed for a measuring counter. The measurement is carried out to a considerable extent using the already existing hardware. It is only necessary to vary the position of the sampling instant, which till now was constant at cStrobeOffset. The position is restipulated after the interval or the asymmetrical delay has been measured.

Alternatively, the measured interval between changes—provided compulsorily in the transmission protocol—of the rising and falling edge of the received signal on the active transmission path, the asymmetrical delay ascertained therefrom and/or the systematic component of the asymmetrical delay may also be utilized for diagnostic purposes. In particular, in this manner it is possible to detect a faulty transmission activity of a transmitting user, a faulty receive activity of a receiving user and/or a defect in the communication link.

Further details and aspects of example embodiments of the present invention are yielded from the following figures description and the related figures.

DETAILED DESCRIPTION

The networking of control units, sensor systems and actuator systems with the aid of a communication system and a communication link, e.g., in the form of a bus system, has increased dramatically in recent years both in the construction of modern motor vehicles as well as in machine construction, especially in the field of machine tools, and in automation. In this context, synergistic effects may be achieved by the distribution of functions to a plurality of users (e.g., control units) of the communication system. These are called distributed systems.

Increasingly, the communication between various users of such a data transmission system is taking place via a bus system. Communication traffic on the bus system, access and receive mechanisms, as well as error handling are regulated by a protocol. For instance, one known protocol is the FlexRay protocol, presently based on the FlexRay protocol specification v2.1. FlexRay is a rapid, deterministic and fault-tolerant bus system, particularly for use in motor vehicles. FlexRay communicates via one or two physically separate lines with a data rate in each instance of 10 Mbit/sec. maximum. However, FlexRay can, of course, be operated with lower data rates as well. The two channels correspond to the physical layer, in particular of the so-called OSI (open system architecture) layer model. They are used chiefly for the redundant and therefore fault-tolerant transmission of messages, but can also transmit different messages, which means the data rate would then double. It is possible that the transmitted signal is yielded as a differential signal from the difference between the two signals transmitted via the lines. The signal transmission via the physical layer may take place electrically, optically, or in any other manner as desired.

Figure 13:
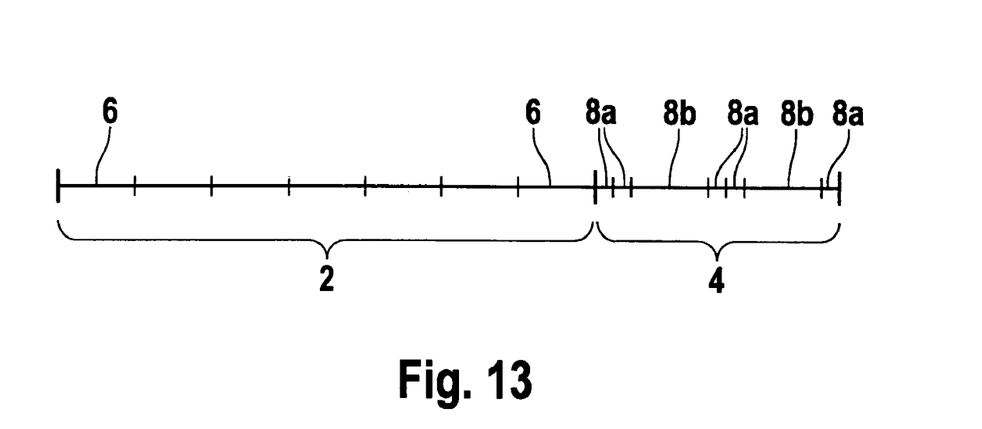
FIG. 13 illustrates coarse configuration of a data frame according to the FlexRay protocol.

The FlexRay protocol operates according to the principle of Time Division Multiple Access (TDMA), in which the users or the messages to be transmitted are assigned fixed time slots in which they have exclusive access to the communication link. The time slots repeat in a fixed communication cycle, so that the instant at which a message is transmitted via the bus can be predicted exactly, and the bus access takes place deterministically. FIG. 13 shows a communication cycle of a FlexRay communication system by way of example. A static part (so-called static segment) is denoted by reference numeral 2, and a dynamic part (so-called dynamic segment) is denoted by reference numeral 4. The time slots, also known as frames, are denoted by reference numeral 6. In order to optimally utilize the bandwidth for the transmission of messages on the bus system, FlexRay subdivides the cycle into a static part (so-called static segment) 2 and a dynamic part (so-called dynamic segment) 4. Fixed time slots 6 are in static part 2 at the beginning of a bus cycle. Time slots 8a, 8b are dynamically predefined in the dynamic part. Therein, the exclusive bus access is now in each case only permitted for a brief time 8a, for the duration of at least one so-called minislot. Only if a bus access takes place within a minislot is time slot 8a lengthened to time 8b necessary for the access. Consequently, bandwidth is thus only used up if it is also actually needed. As far as their size and structure are concerned, time slots 8b for the data transmission in dynamic segment 4 correspond essentially to fixed time slots 6 of static segment 2.

To realize synchronous functions and to optimize the bandwidth by small intervals between two messages, the users in the communication network need a common time base, the so-called global time. Synchronization messages are transmitted in static part 2 of the cycle for synchronizing the clocks, the local clock time of a user being corrected with the aid of a special algorithm corresponding to the FlexRay specification in such a way that all local clocks run in synchronization with a global clock.

Example embodiments of the present invention are described by way of example based on a FlexRay data transmission system. However, this is not to be understood as a restriction with regard to example embodiments of the present invention. On the contrary, example embodiments of the present invention may be used for many different types of data transmission systems and may be easily transferable to comparable systems.

Figure 14:
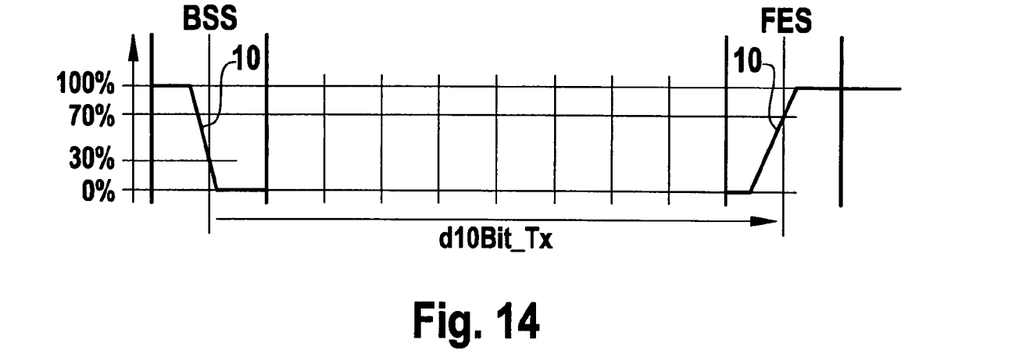
FIG. 14 illustrates asymmetrical distortions in the case of a high-low edge of a BSS or in the case of a low-high edge of an FES (frame end sequence)
Figure 15:
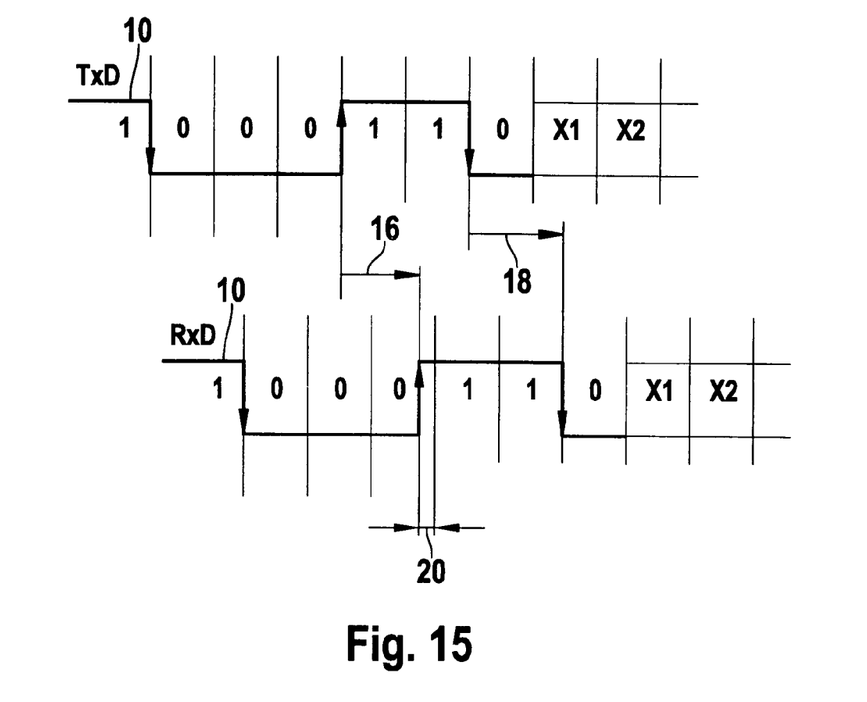
FIG. 15 illustrates resulting delays between transmitted signal (TxD) and received signal (RxD) for rising and falling edges.

FIG. 14 shows that signals 10, which are transmitted via connecting lines of the communication link from a transmitting user of the communication system to a receiving user, do not have an ideal rectangular characteristic in the area of edge changes from high to low or from low to high, but rather have a slanting, ramp-shaped characteristic. It can be seen that the gradient of the falling edge and of the rising edge is different. Because of this difference and the different edge durations, the resulting delays between transmitted signal 10 (TxD) and received signal 10 (RxD) are different for rising and falling edges (see FIG. 15). An asymmetrical delay 20 results as a function of the difference of the delays for rising edges 16 and falling edges 18. The characteristic of transmitted signal 10 (TxD) is shown at the top in FIG. 15, and the characteristic of received signal 10 (RxD) is shown at the bottom. Delays 16, 18 pertain to the difference of the corresponding edges between transmitted signal TxD and received signal RxD.

In transmitting data or messages via a bus system with such delays, pulses are distorted because high-to-low and low-to-high edges on the transmission path are delayed by different amounts. If, in the related art, the transmitted pulse is sampled a multiple number of times (for example, 8 times per bit) in the receiver with the sample clock (the so-called sampling rate) predefined in a fixed manner there, then the position of the sampling point, i.e., the selection of exactly one of these 8 sampling values, decides whether the datum is sampled correctly or incorrectly. This is explained in greater detail in the following with reference to FIGS. 16, 17 and 18.

Figure 16:
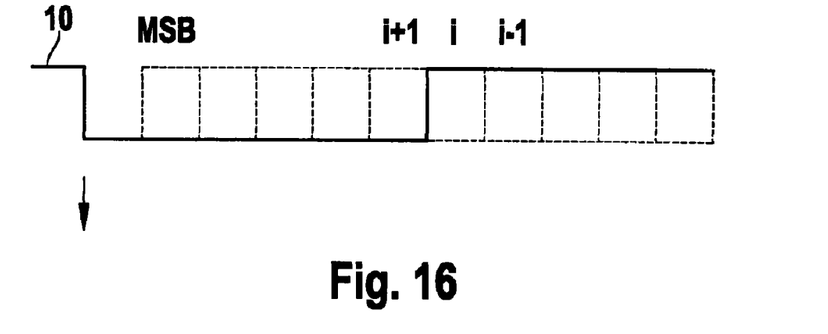
FIG. 16 illustrates a pulse sequence to be transmitted, with defined synchronization position.
Figure 17:
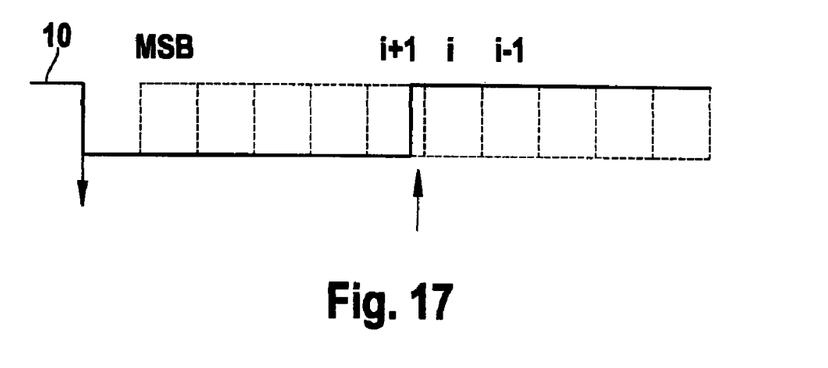
FIG. 17 illustrates a distortion of a low-high edge advanced in time, and a sampling of a false bit value when working with a sample clock which is too slow.
Figure 18:
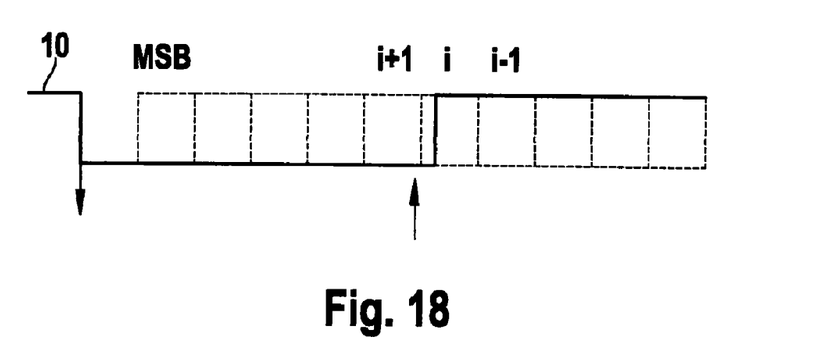
FIG. 18 illustrates a distortion of a low-high edge retarded in time, and a sampling of a false bit value when working with a sample clock which is too fast.

FIG. 16 shows a pulse-timing diagram for a transmitted bit sequence of a signal 10, which begins with a high-low edge between a first bit=high (1) and a second bit=low (0), and after that includes a plurality of bits having the value low (0) and then at least one bit i having the value high (1). The bit positions are designated by dashed lines; for example, the transmission is begun with the Most Significant Bit (MSB). Due to the asymmetrical delay of the transmission channel, during the transmission, a shift of the low-high edge may take place between bit (i+1) and bit i either to earlier points of time (FIG. 17) or to later points of time (FIG. 18).

The bit values are sampled using a sample clock with a frequency which is an n-fold of the data-bit rate, but with an allowed frequency deviation between transmitter and receiver. The result may be that the bit value is no longer sampled exactly in the middle. If the asymmetrical distortion and the shift of sampling instant 12 per bit position now unfavorably coincide, it may happen that the incorrect value 1 is detected for bit value (i+1) (FIG. 17) or the incorrect value 0 is detected for bit value i (FIG. 18). This is caused by the fact that, in the related art, a fixed sample-counter value k, where $1 \leq k \leq n$, is used. In other words, it is exactly stipulated which of the n sampling values of a bit is actually utilized as bit value.

Owing to the fixed selection of sampling instant 12 per bit (for example, given 8 sampling values per bit at the 5th sampling value, in the middle of a bit), both the influence of the asymmetrical delay as well as the frequency deviation and the additional time discretization due to the sampling are a problem, and place high demands on the transmission channel. Increasing the edge steepness in order to reduce the asymmetrical delays would indeed bring advantages for the timing, but on the other hand would require technically more demanding and thus costlier components, and in addition would unfavorably influence the EMC performance of the data transmission system. However, depending on the pulse distortion, one runs the risk of evaluating the incorrect datum either at the one or the other bit boundary.

Figure 1:
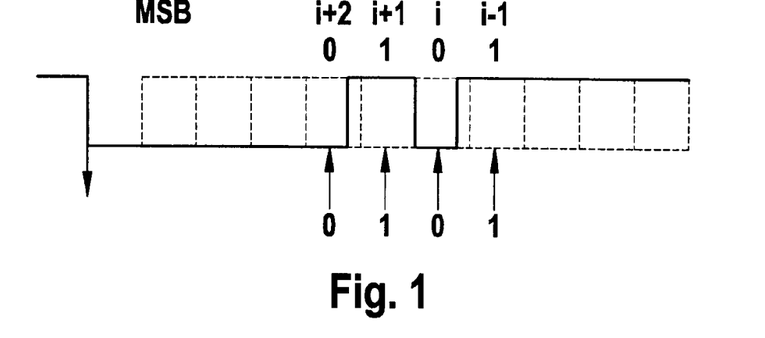
FIG. 1 illustrates a systematic distortion of a low-high edge advanced in time in the case of several edges, and a shift of the sampling instant by x sample clocks toward advance according to example embodiments of the present invention.
Figure 2:
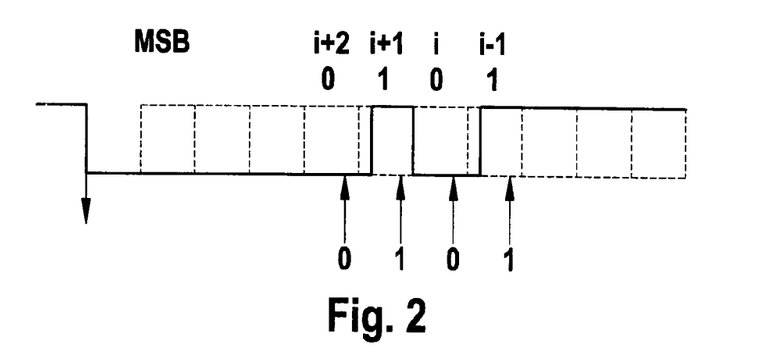
FIG. 2 illustrates a systematic distortion of a low-high edge retarded in time in the case of several edges, and a shift of the sampling instant by x sample clocks toward retard according to example embodiments of the present invention.

The asymmetrical distortions in the transmission channel have a systematic component, that is, the corresponding edges are delayed similarly relative to each other. To compensate for this systematic component, according to example embodiments of the present invention, depending upon variant a or b, it is provided to shift sampling instant 12 by x sample clocks to a sample-counter value k+x, where x<0 (see FIG. 1) or x>0 (see FIG. 2), to thereby increase the robustness of the transmission (corrected sampling instant 12').

In order to ascertain the amount of the corresponding useful systematic shift of sampling instant 12 during a transmission, one must be able to measure the transmission link. To that end, for transmitted signal 10, prior to the transmission of the information bits in a frame 6, 8b, one needs at least one sequence of two edges in different direction with defined interval relative to each other, and must ensure that during the transmission of this edge pair, the same systematic conditions exist as during the transmission of the information bits in this channel. For that purpose, it may be provided that, already during the setup of the transmission channel, one is able to resort to exactly defined bit sequences (e.g., frame start bits or byte start sequences). Alternatively, there is also the possibility of additionally inserting exactly defined data words for the purpose of the measurement into the protocol of a data transmission. A data word having a very large interval between the two edges (falling and rising edge) is suitable for that purpose, in order to be able to take the influence of the clock-frequency deviation more exactly into consideration. For instance, such a data word is 0x00 (binary: 00000000) or 0xFF (binary: 11111111). A data word having very many edges is likewise suitable in order to reduce the influence of stochastic elements, such as interferences on the channel, by averaging the measuring results, majority voting or other methods. For instance, such a data word is 0x55 (binary: 01010101) or 0xAA (binary: 10101010). Moreover, it is possible to adapt the initially measured value for the systematic component of the asymmetrical delay during the course of the data transmission. This is particularly of interest when larger intervals exist between the synchronization instants (reset of the sample counter), and therefore, given a greater deviation of the clock pulse because of the relative shift of sampling instant 12 thereby caused, data at the end of such a section are more susceptible to error.

Figure 3:
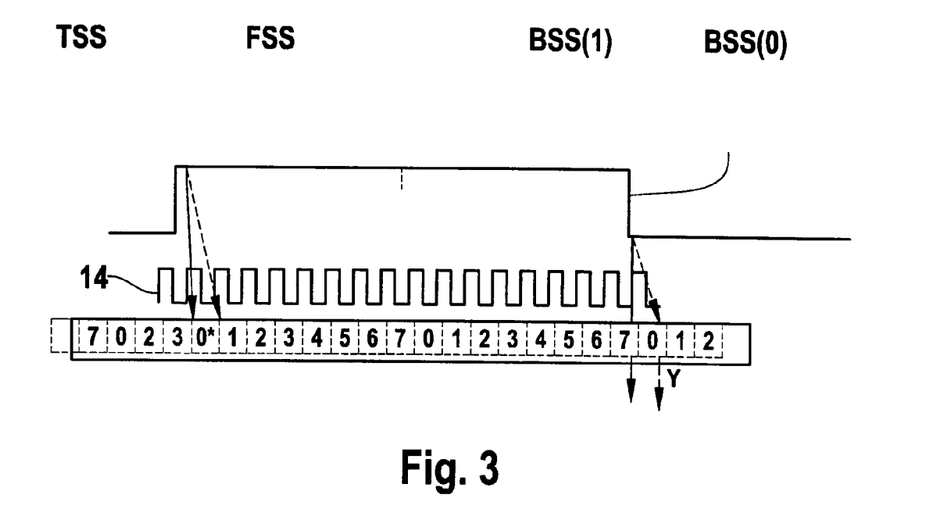
FIG. 3 illustrates utilization of a measuring counter for determining the channel symmetry with the aid of FSS (frame start sequence) and BSS (byte start sequence)

In an example embodiment of the present invention, a frame start sequence (FSS), together with the first bit of a byte start sequence (BSS) according to FlexRay protocol specification v2.1, is utilized for the measurement. This bit sequence is made up of two high bits, preceded and followed in each case by at least one low bit. The possibility thereby exists to determine the pulse distortion (the asymmetrical delay on the transmission path). If one starts out from a bit duration of 100 ns and a sampling with an 80 MHz clock-pulse rate, an oversampling of n=8 is obtained. FIG. 3 shows the pulse sequence and the associated sample clock, and the measuring counter.

To determine the measured value, a modulo-n counter having at least $1d(n)$ bits is usefully employed, that is, a $1d(8)=3$ bit measuring counter is needed for an n=8-fold oversampling. For distortions which can amount to up to 50% of a bit time and more, the counter may even be expanded by at least 1 bit. This counter is set by the first high value of the FSS in synchronism with the sample clock to '0' (solid-line arrow in FIG. 3) or with the next clock pulse to '1' (dashed-line arrow in FIG. 3). With the following first low value of the BSS, the counter reading is stored in synchronism with the sample clock, possibly one clock pulse later at measuring point Y here, as well. The stored value is a measure for how the shift of sampling instant x must be selected in order to take the systematic distortion into account. In the example shown in FIG. 3, the value=1 is at position Y, and therefore the distortion is equal to 0, that is, x is to be set to '0'. Instant Y represents the instant after which the value '0' of the bit sequence was stored by the sample clock. At the same time, the measuring counter has also been incremented by one value. Due to the time discretization with the counting pulse (asynchronism of the clock pulse with respect to the received bit sequence) and the frequency deviation of the clock pulse in the receiver, even given an undistorted pulse FSS-BSS(1) of the length of exactly two bit times, the measured value can lie between '0' and '2'. In the case of undistorted pulse transmission, the value '0' is only reached if the receiver clock pulse is not faster than the transmitter clock pulse, and the value '2' only if the receiver clock pulse is not slower than the transmitter clock pulse. As a function of the measured value, especially if it is unequal to '0', '1' or '2', it must be differentiated whether the synchronization of the sample counter begins with a high-low or a low-high edge, that is, whether the real distortions go in the same direction as in the measuring, or in the other direction. In the example of FlexRay, the sample counter is triggered with the high-to-low edge of the BSS(1) to BSS(0) bit. A value of '2', '3' or '4' should therefore lead to a negative value of x. Table 1 shows the proposed values, depending on whether one allows a one, two or even three clock-pulse shift. A general case is indicated when one can still decide between positive and negative shift in the boundary region, as well. To that end, if applicable, the resolution of the measuring counter may still be increased by an expanded bit width. In particular, however, if one must also reckon with stochastic interferences, it is sensible to provide no more than one clock pulse for the shift of the sampling point. This makes the sampling more robust.

TABLE 1

Determining correction value x from the measured value of the 3-bit measuring counter according to FIG. 3

| measured value at Y | Shift maximal | | | |
| --- | --- | --- | --- | --- |
| | for 1 clock pulse x | for 2 clock pulses x | for 3 clock pulses x | General x |
| 0 | 0 | 0 | 0 | 0 |
| 1 | 0 | 0 | 0 | 0 |
| 2 | −1 | −1 | −1 | −1 |

TABLE 1-continued

Determining correction value x from the measured value of the 3-bit measuring counter according to FIG. 3

| measured value at Y | Shift maximal | | | |
| --- | --- | --- | --- | --- |
| | for 1 clock pulse x | for 2 clock pulses x | for 3 clock pulses x | General x |
| 3 | −1 | −2 | −2 | −2 |
| 4 | −1 | −2 | −3 | −3 |
| 5 | 1 | 2 | 3 | 3 |
| 6 | 0 | 1 | 2 | 2 |
| 7 | 0 | 1 | 1 | 1 |

Figure 4:
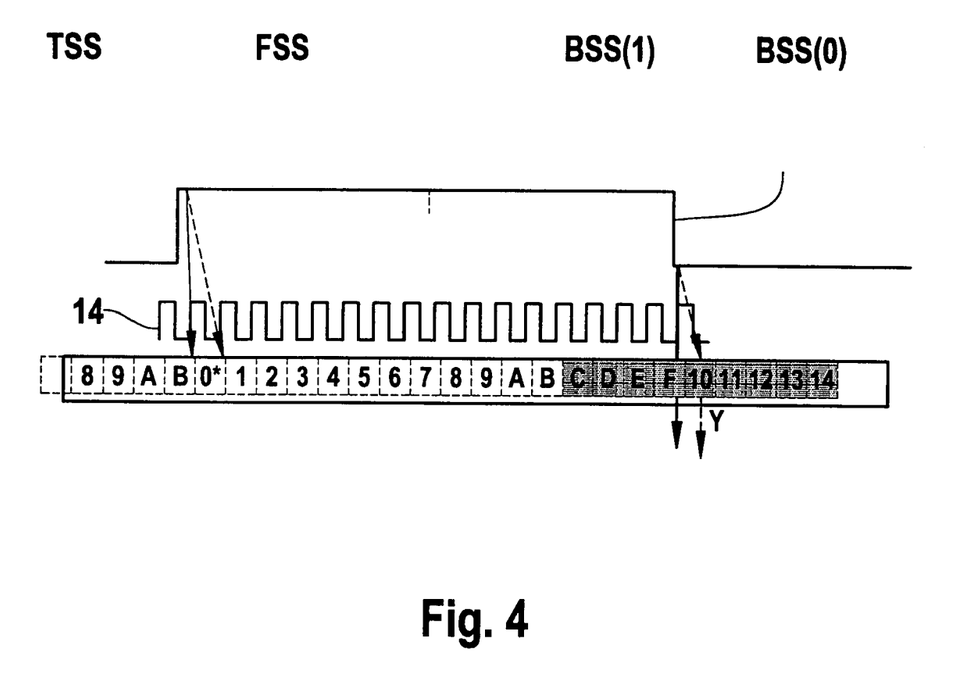
FIG. 4 illustrates utilization of an expanded measuring counter for determining the channel symmetry with the aid of FSS and BSS.

To further increase the robustness of the measuring method, it is also of interest to provide the measuring counter with at least one, or better, at least two additional bits, and to make the evaluation of the BSS high-to-low edge dependent on a minimum counter reading (e.g., decimal 12, that is, hexadecimal 0xC) (see FIG. 4). In this manner, the correction values of Table 2 are derivable from the measured values. The first column for the value x is aimed at the theoretically possible shifts of sampling instants 12; the proposed shift by a maximum of one clock pulse is more robust and still permits a reliable correction even in the case of existing stochastic influences. Between these two extremes, any intermediate variants are possible, which can be decided from other points of view.

TABLE 2

Determining correction value x from the measured value of the 5-bit measuring counter according to FIG. 4

| measured value at Y | Shift maximal | | |
| --- | --- | --- | --- |
| | possible x | proposed X | adaptively after several measurements x |
| 0x0C | 4 | 0 | 1 |
| 0x0D | 3 | 0 | 1 |
| 0x0E | 2 | 0 | 1 |
| 0x0F | 1 | 0 | 1 |
| 0x10 | 0 | 0 | 0 |
| 0x11 | 0 | 0 | 0 |
| 0x12 | −1 | −1 | −1 |
| 0x13 | −2 | −1 | −2 |
| 0x14 | −3 | −1 | −2 |

To further increase the robustness, the value sampled in each case may also still be compared to previous and/or subsequent sampling values, and the valid signal ascertained from these values by majority voting. To that end, the sampled input signal of FIG. 3 or 4 is already the voted input signal in which smaller interferences are already suppressed.

The measuring methods according to FIGS. 3 and 4 in conjunction with Tables 1 and 2 are of interest when the systematic component of the channel distortions (asymmetrical delay, various delays of high-low and low-high edge) is higher than the stochastic component (EMC irradiation, interferences). This is present in a FlexRay communication system. However, in the example embodiment, because of the stochastic components always present, the theoretically indicated correction value (e.g., Table 2) is not very meaningful. In order to be able to evaluate stochastic influences, and therefore to gain higher accuracy for the correction value, it is necessary to perform several measurements as in the manner shown in FIG. 3 or 4. If not already present in the protocol, additional, exactly defined pulse shapes suitable for that purpose can be provided at the start of a transmission and transmitted prior to the actual data and other information (e.g., in a header line, the so-called header).

Instead of the storage of the 5 bits of the measuring counter from FIG. 4, in conjunction with Table 2, the proposed correction value (one bit) may also be stored directly. This saves on hardware expenditure and allows a simple voting in the case of several measurements, for which in each case also only one correction value of 1 bit was stored. To that end, for example, it is possible to transmit one byte having the data value 0xAA or 0x55, in order to be able to analyze as many pulses as possible for their distortion. Regardless of whether, for example, the high phase of a pulse now takes place over 2, 3 or 4 bit times, or only over one, the correction value x negative is only the deviation of the measured value from the measurement of a high pulse. In the case of low pulses, it becomes positive. At the end, a summary correction value can be formed from all measured values by averaging, voting or other suitable methods.

On the other hand, if the influences of the clock-pulse deviation between transmitter and receiver are dominant, then it is advantageous to use at least one high pulse or low pulse of greater duration for the measurement, e.g., one byte having the data value 0x00 or 0xFF. In this way, it is possible to better ascertain the clocking accuracy and to better take it into account in the shift of sampling instant 12.

Figure 6:
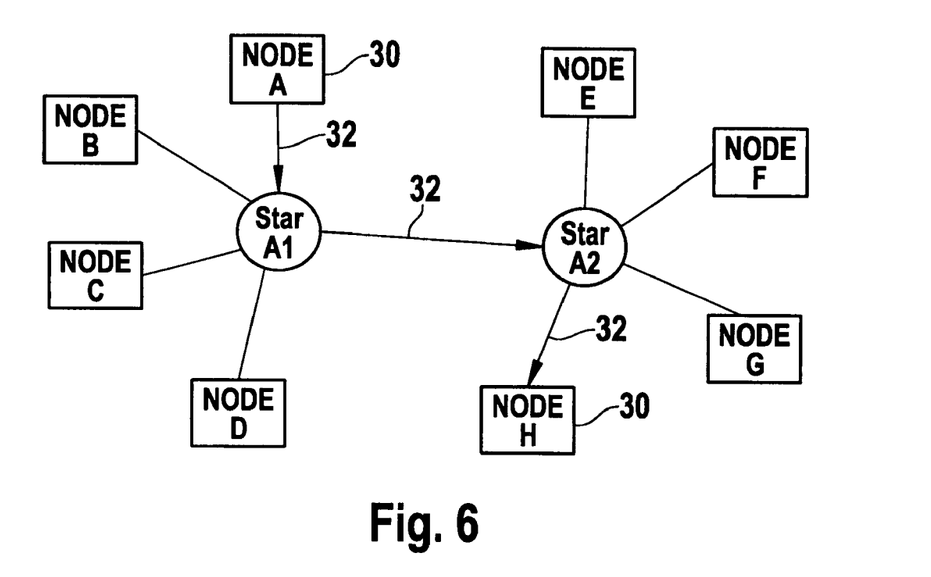
FIG. 6 illustrates an exemplary topology of a data transmission system according to example embodiments of the present invention, having two stars and eight nodes, among which data are transmitted.

For clarification, FIG. 6 shows one possible FlexRay data transmission system having two stars and 8 user nodes 30, among which data are transmitted via connecting lines 32. One possible transmission path from node A to node H via two active stars A1 and A2 is shown. The channel distortions described occur in this context. Theoretically, it would be possible to fulfill the correct sampling with a permitted clocking accuracy of, e.g., 1,500 ppm and channel distortions tfr of, e.g., 35% of one bit time. In this observation, however, neither inaccuracies of the transmitter clock pulse nor asymmetries of individual circuit elements are sufficiently taken into account, so that the physical layer specification, which would create the necessary conditions for this purpose, would not be realizable. Therefore, according to example embodiments of the present invention, a method is introduced with which time can still be saved. In this context, the worst cases (worst case 1 and worst case 2) are that the receiver has the slowest sample clock, and the time between falling and rising edge, thus the tfr time, is shortened, for example, by 35 ns, or that the receiver has the fastest sample clock, and the tfr time is lengthened by, for example, 35 ns.

Figure 7:
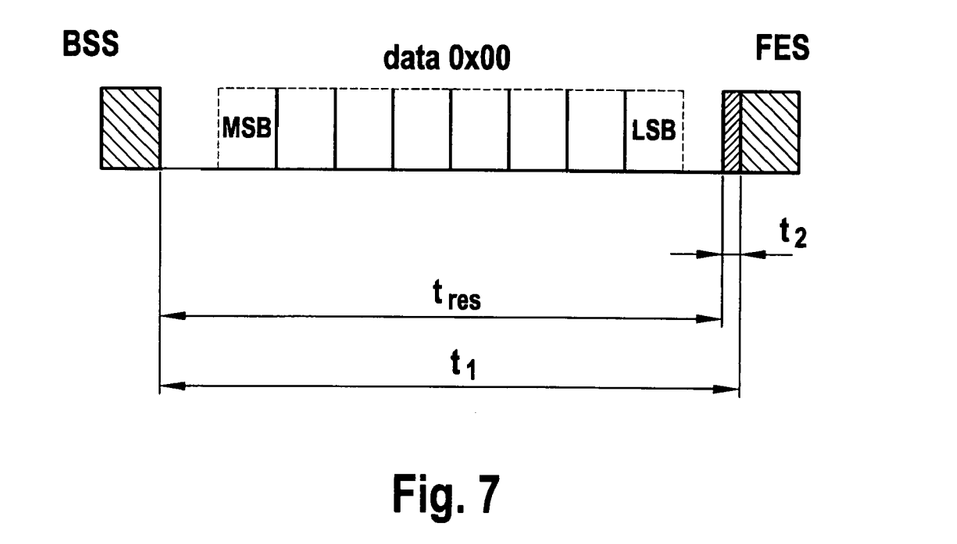
FIG. 7 illustrates a first worst case in which a receiver node has the slowest clock pulse, and the time between falling and rising edge is shortened.

FIG. 7 shows the first worst case for the distorted waveform transmitted from TxD node A and arriving at RxD node H. The following applies for the somewhat too fast clock-pulse rate of node A: clk_pA=12.48125 ns (fast: −0.15% of the cycle time). The following applies for the somewhat too slow clock-pulse rate of node H: clk_pH=12.51875 ns (slow: +0.15% of the cycle time). The nominal cycle time clk_p_nom amounts to 12.5 ns. The following holds for the waveform transmitted from TxD node A to RxD node H: t_1=10*8*clk_p_nom=1,000 ns. According to Protocol Specification 2.0.20, Page 73, Table 3-1 and Point 3.2.7.5, tfr=(n+/−0.35)*gdBit and is not dependent on the actual clock-pulse rate of the transmitter node.

In the example from FIG. 7, it is assumed that the tfr asymmetry gdBit is −35%. As a result of the distortion, the FES (frame end sequence) edge comes too early by t_2=0.35*8*clk_p_nom=35 ns. t_res is obtained from the difference of t_1 and t_2 at 965 ns, which corresponds to tfr.

The sample counter is initially set to '1' (synchronized) upon detection of the BSS high-low edge. This is carried out again with each byte start because of the different clock pulses in the transmitter and receiver. If the sampled values are also voted (majority formation for suppressing smaller interferences), the byte start is first detected after a voting delay t_VD1. The voted signal changes its value after a voting delay of 2 or 3 clock pulses (up to 3 because of asynchronism of waveform and clock pulse relative to each other).

Figure 8:
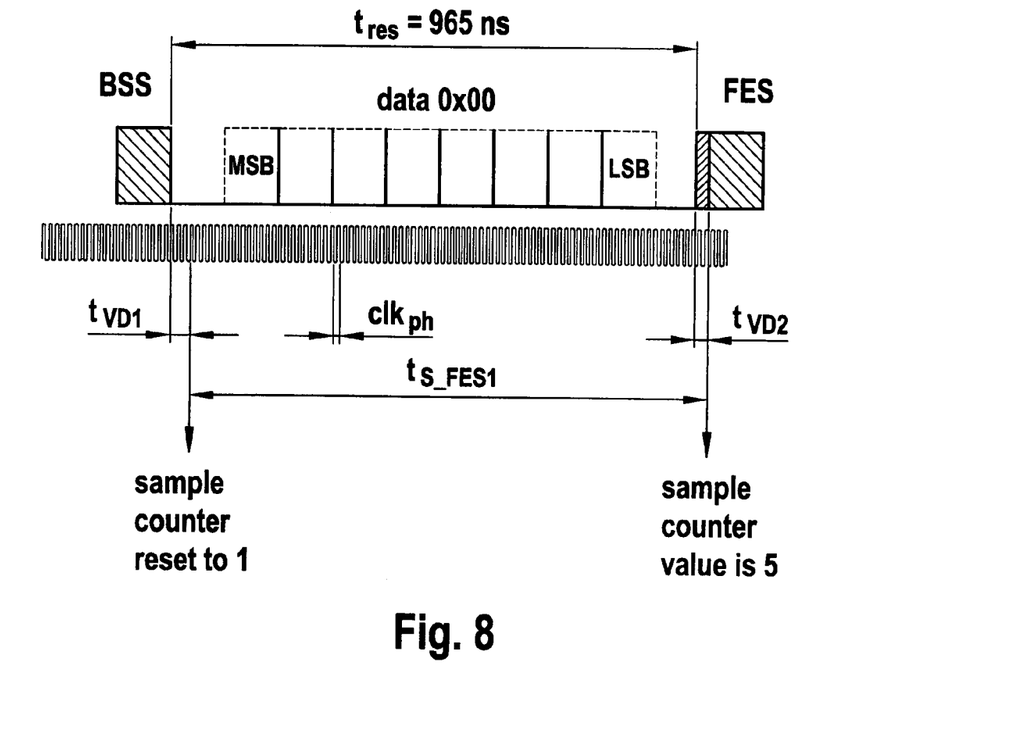
FIG. 8 illustrates a correct sampling of the signal, taking a time reserve for the case according to FIG. 7 into account.

FIG. 8 illustrates the waveform sampled by receive node H. For delay t_VD because of the voting, the following applies: 2*clk_pH<=t_VD<=3*clk_pH. t_VD1 is equal to 3*clk_pH and t_VD2=2*clk_pH. tS_FES1=(9*8+4+t_VD1−t_VD2)*clk_pH=77*12.51875 ns=963.94375 ns. For a correctly sampled FES1 value, it holds that t_res must be greater than tS_FES1. The example from FIG. 8 reveals that the sampling by node H functions correctly with a time reserve of 1.05625 ns. However, time reserve t_res−t_S_FES1 of approximately 1 ns is not sufficient to satisfy all the interests indicated above. At most, it would be sufficient to compensate for a jitter of the sample clock of +/−0.5 ns.

Figure 9:
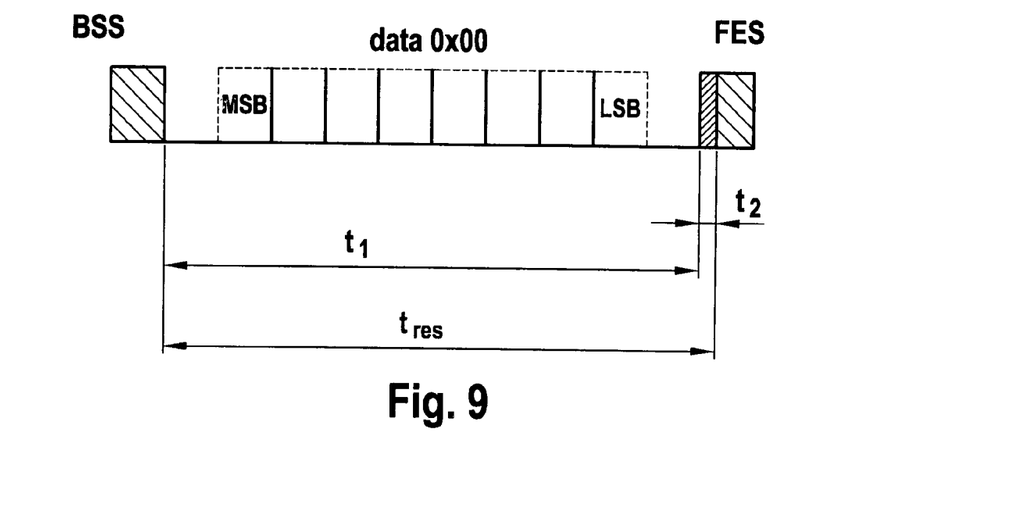
FIG. 9 illustrates a second worst case in which a receiver node has the fastest clock pulse, and the time between falling and rising edge is lengthened.

FIG. 9 shows the other worst case. The following holds for the somewhat too slow clock-pulse rate of node A: clk_pA=12.51875 ns (slow: +0.15% of the cycle time). The following applies for the somewhat too fast clock-pulse rate of node H: clk_pH=12.48125 ns (fast: −0.15% of the cycle time). Nominal cycle time clk_p_nom is 12.5 ns here, as well. The following applies for the waveform transmitted from TxD node A to RxD node H: t_1=10*8*clk_p_nom=1,000 ns. According to Protocol Specification 2.0.20, Page 73, Table 3-1 and Point 3.2.7.5, tfr=(n+/−0.35)*gdBit and is not dependent on the actual clock-pulse rate of the transmitter node. In the example from FIG. 9, it is assumed that the tfr asymmetry gdBit is +35%. As a result of the distortion, the FES (frame end sequence) edge comes too late by t_2=0.35*8*clk_p_nom=35 ns. t_res is obtained from the sum of t_1 and t_2 at 1035 ns, which corresponds to tfr.

Figure 10:
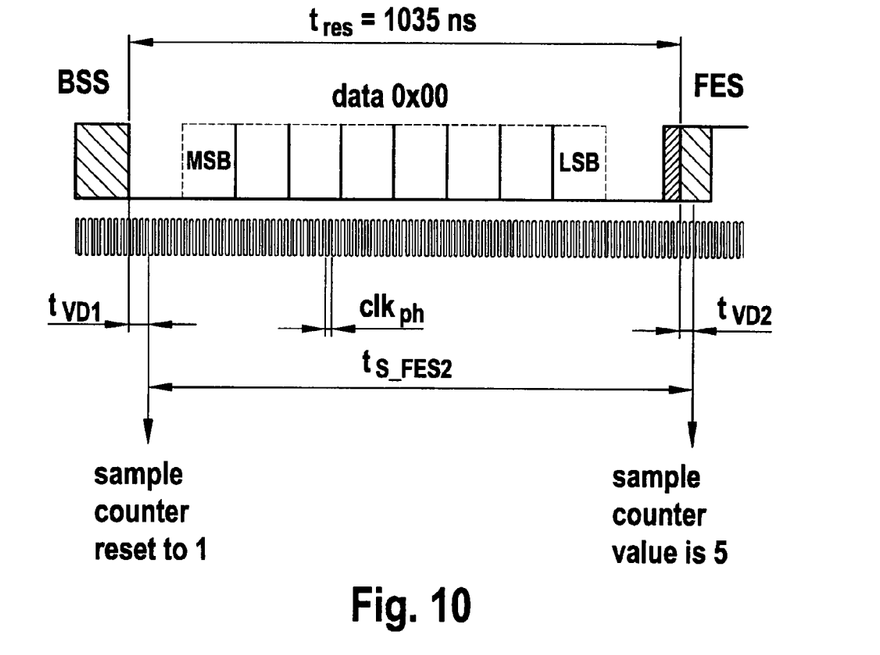
FIG. 10 illustrates a correct sampling of the signal, taking a time reserve for the case according to FIG. 10 into account.

FIG. 10 illustrates the waveform sampled by receive node H. For delay t_VD because of the voting, the following applies: 2*clk_pH<=t_VD<=3*clk_pH. t_VD1 is equal to 2*clk_pH and t_VD2=2*clk_pH. tS_FES2=(10*8+4+t_VD1−t_VD2)*clk_pH=84*12.48125 ns=1,048.425 ns. For a correctly sampled FES2 value, it holds that t_res must be less than tS_FES2. The example from FIG. 10 reveals that the sampling by node H functions correctly with a time reserve t_S_FES2−t_res of 13.425 ns. If sampling instant 12 were shifted forward here by one clock pulse, that is, if sampling were already carried out at sample-counter value '4' one would also still obtain the correct value, but the time reserve would dwindle to less than 1 ns (0.94375 ns) Therefore, it would no longer be possible to include the aforesaid additional distortions. Therefore, errors would occur in the transmission.

Thus, the explanations above reveal that the required conditions with respect to robustness of the data transmission are fulfilled only purely theoretically with regard to the protocol specification. In both cases, sample-counter values of '4' or '5' may be used for correct data sampling. If one were now able to predict whether the edge distortion in the case of tfr has an effect advanced or retarded in time, i.e., in the direction of a shortening or lengthening of the low region, one could make the transmission more robust in specific manner by the selection of the sampling point. In the two worst cases shown (see FIGS. 7 and 9), the transmission is accomplished at both sampling points '4' and '5', but with different robustness depending on the distortion. In the case of the channel distortion, it is only possible to take the systematic component— which, however, is the greater component—into account. Therefore, the direction of the edge distortion itself can still be measured when it has a stochastic component, provided the systematic distortion high lies in the one or other direction. Given a rather balanced systematic distortion, it is unimportant in any case at which value the sampling is carried out, as the worst-case examples from FIGS. 7 and 9 above have shown.

Figure 11:
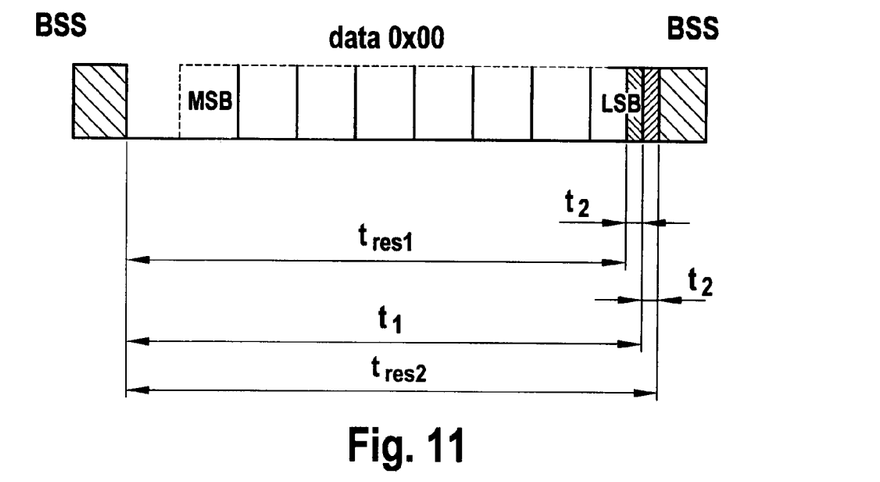
FIG. 11 illustrates determining the channel distortion (shortening or lengthening of the low phase of a signal between two BSS) with the aid of a data byte 0x00 that preferably is additionally transmitted as the first data byte of a data frame.

FIG. 11 now shows how, in respect to a data byte 0x00, which in addition is preferably transmitted as the first data byte of a data frame, it is possible to determine whether such a complete low phase between two byte start sequences (BSS) has been shortened or lengthened by the channel distortions. The measurements are represented for the worst case here, as well. The following holds true for the waveform received at the RxD node: $t\_1 = 9*8*clk\_p\_nom = 900$ ns. According to Protocol Specification 2.0.20, Page 73, Table 3-1 and Point 3.2.7.5, $tfr = (n+/-0.35)*gdBit$ and is not dependent on the actual clock-pulse rate of the transmitter node. In the example from FIG. 11, it is assumed that the tfr asymmetry gdBit is +/−35%. As a result of the distortion, the FES (frame end sequence) edge comes by $t\_2 = 0.35*8*clk\_p\_nom = 35$ ns too early or too late. t_res1 or t_res2 is obtained from the difference of $t\_1$ and $t\_2$ at 865 ns, which corresponds to tfr(min), or from the sum of $t\_1$ and $t\_2$ at 935 ns, which corresponds to tfr(max).

Figure 12:
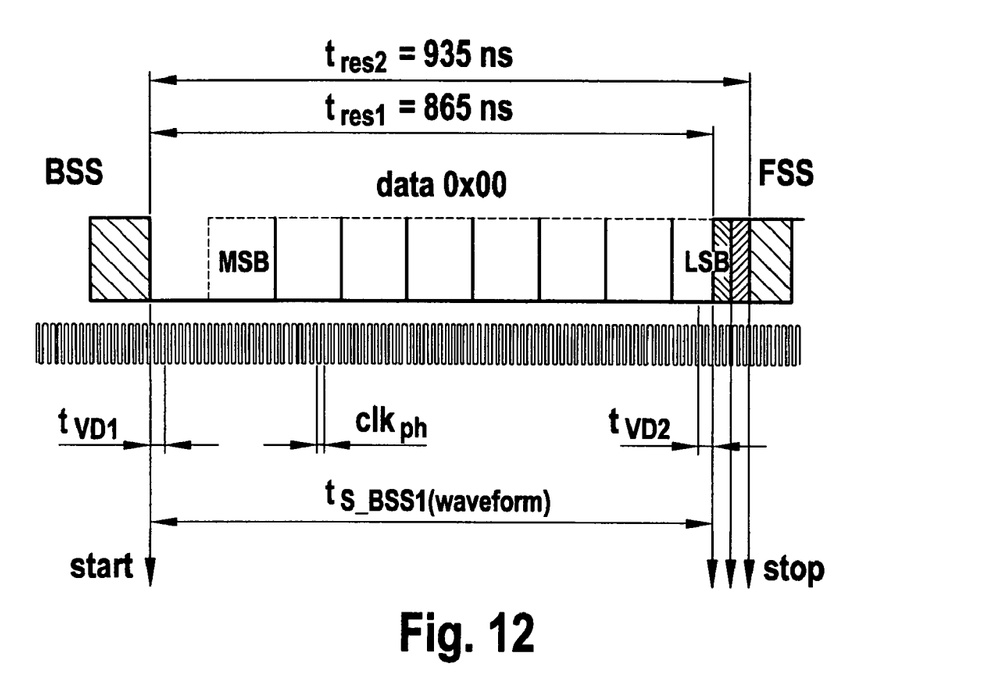
FIG. 12 illustrates storage of the sample-counter value in which the BSS high-low edge has been discovered, for measuring the channel distortions for the case according to FIG. 12.

FIG. 12 illustrates the waveform sampled by receive node H. For delay t_VD1 because of the voting, the following applies: $2*clk\_pH \leq t\_VD1 \leq 3*clk\_pH$ und for t_VD2: $2*clk\_pH \leq t\_VD2 \leq 3*clk\_pH$. For a first considered case (x=1 . . . 4), it follows that:

$$tS\_BSS1a = (9*8+(x-1)+t\_VD1-t\_VD2)*clk\_pH$$

$$tS\_BSS1a\_min = (72+1-1-1)*12.51875 \text{ ns} = 888.83125 \text{ ns}$$

$$tS\_BSS1a\_max = (72+4-1+1)*12.51875 \text{ ns} = 951.425 \text{ ns.}$$

Therefore, tS_BSS1a moves in a range between 888.83125 ns and 951.425 ns.

For a second considered case (x=5 . . . 8), it follows that:

$$tS\_BSS1b = (9*8+(x-1)+t\_VD1-t\_VD2)*clk\_pH$$

$$tS\_BSS1b\_min = (72+5-1-1)*12.48125 \text{ ns} = 936.09375 \text{ ns}$$

$$tS\_BSS1b\_max = (72+8-1+1)*12.48125 \text{ ns} = 998.5 \text{ ns.}$$

Therefore, tS_BSS1b moves in a range between 936.09375 ns and 998.5 ns.

FIG. 12 shows that simply the sample-counter value in which the BSS low-high edge has been detected is to be stored, that is, when the signal value high is sampled the first time. The sample counter is started or synchronized, i.e., set to '1' at the high-low BSS edge, delayed by time t_VD1 for the voting. The measurement is ended, that is, the measuring counter is stopped at the counter reading, and the measured value is stored, at which the data are equal to '1' the first time. Depending on the distortion, this point of time lies between t_res1 and t_res2 after the start of the counter. Table 3 shows an assignment of the sampled counter values to the corresponding sampling instants for the example from FIG. 12. There are only values '1' through '8' for the sample counter provided now. The measured values correspond to the lowest reading of the sample counter for BSS(1) of the second byte, which was measured after the first header byte with the data value 0x00. In Table 3, the constant cStrobeOffset is assigned as sampling instant 12 to each of these values. The sampling instant is set to the value of the constant. Instead of the value '5', until now predefined in a fixed manner in the specification, the intention is then to change variably between '4' and '5', depending on the measuring result. The time intervals of the sampled waveform from FIG. 11 overlap. An arbitrary assignment is thereby possible, provided the systematic errors are not extreme.

TABLE 3

Assignment of measured value to sampling instant 12 for FIG. 12.

| Measured Value | cStrobeOffset |
|---|---|
| 1 | 4 |
| 2 | 4 |
| 3 | 4 |
| 4 | 4 |
| 5 | 5 |
| 6 | 5 |
| 7 | 5 |
| 8 | 5 |

Figure 5:
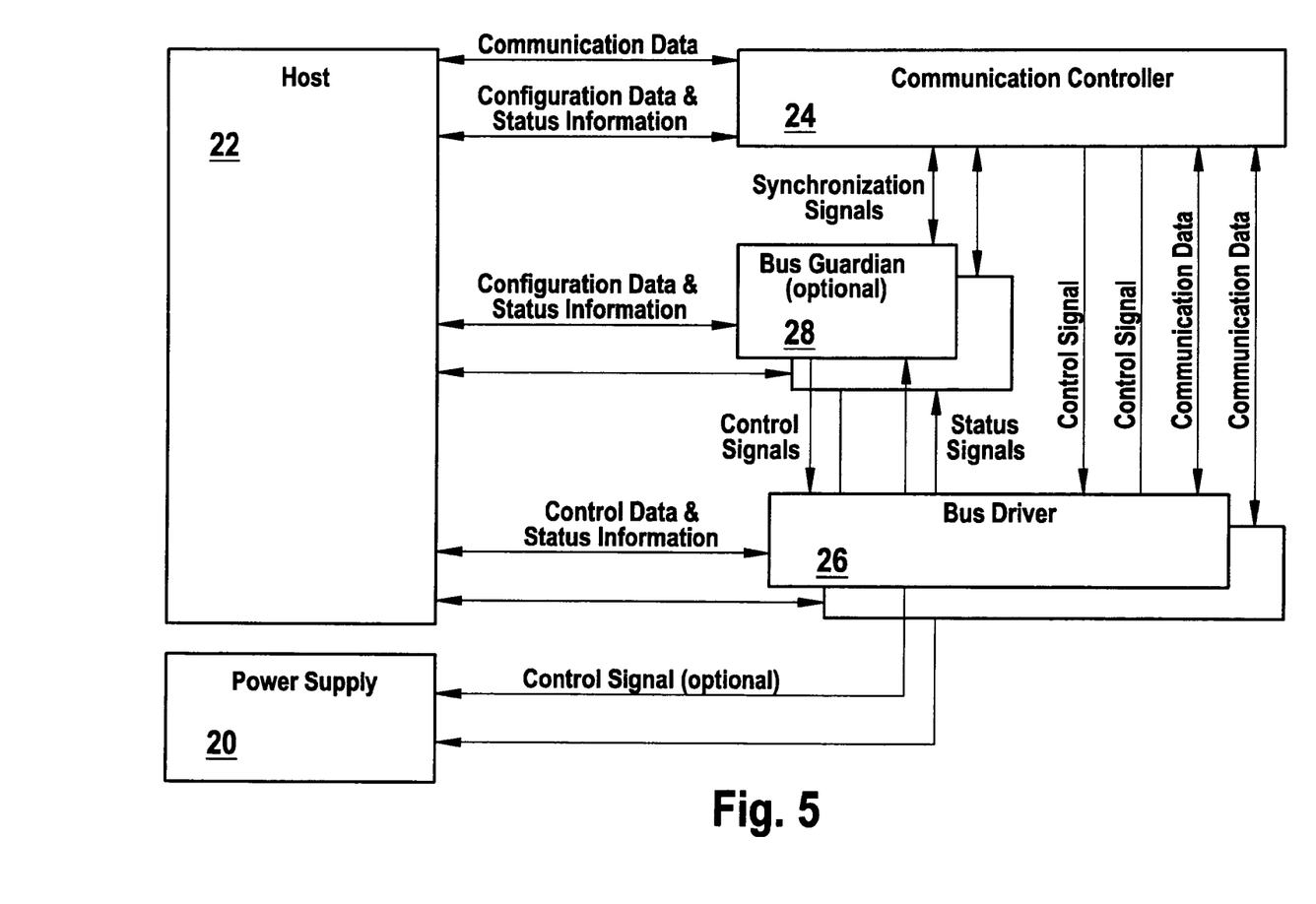
FIG. 5 illustrates a user, according to example embodiments of the present invention, of a data transmission system in detail.

FIG. 5 shows, by way of example, a user node according to the present invention of a data transmission system. The user has a power supply 20 and a host 22 which, for example, takes the form of a microprocessor. Power supply 20 provides all components of the user with the necessary power. In addition, the user includes a communication controller 24, which codes the data to be transmitted (from host 22) and relays it to a bus driver 26 of the user for transmission via the communication link, or decodes the received data (from a bus driver 26) and relays it to host 22 for further processing. If the user is connected to a plurality of communication links, it includes a plurality of bus drivers 26, preferably a separate bus driver 26 for each communication link. Optionally, at least one bus guardian 28, which monitors the operation of the at least one bus driver 26, may be provided in the user.

In communication controller 24, among other things, the data to be transmitted are brought into the format stipulated according to the data transmission protocol (e.g., FlexRay) used. To that end, for example, the data are brought into suitable data frames with defined structure, which are transmitted serially bit-by-bit. Also provided in communication controller 24 is a device for sampling each received bit using a plurality of clock pulses; synchronization points (e.g., BSS in the case of FlexRay) for the reference of a sampling may be predefined within a data frame for each received bit.

Communication data and status information are exchanged between host 22 and communication controller 24, host 22 and bus driver 26, as well as between host 22 and bus guardian 28. The data (communication data) transmitted or to be transmitted are exchanged between host 22 and communication controller 24, and further between communication controller 24 and the at least one bus driver 26. Control signals are transmitted from communication controller 24 to the at least one bus driver 26, from bus guardian 28 to the at least one bus driver 26, and from bus driver 26 to power supply 20. In case of a fault, bus guardian 28 is thereby able to interrupt the power supply for one or more of the user components, in order to prevent a further faulty data transmission.

Synchronization signals are exchanged between communication controller 24 and the at least one bus guardian 28. Status signals are transmitted from the at least one bus driver 26 to bus guardian 28.

Finally, means for the variable setting of sampling instants 12' of the bits of a received signal are also provided in communication controller 24. For example, sampling instants 12' may be set as a function of the quality of the transmitted signal, especially as a function of an asymmetrical distortion of rising and falling signal edges. To that end, communication controller 24 may additionally have a device for measuring the quality of the signal, especially the asymmetrical distortion of rising and falling signal edges. The signal quality is preferably measured under constant boundary conditions, that is, for example, at constant ambient pressure, at constant ambient temperature and constant supply voltage. To measure the asymmetrical delay of the signal, a known interval between a rising and a falling edge or between a falling and a rising edge of the signal may be measured and compared to the known value. The asymmetrical delay may be ascertained from the difference between the actually measured interval and the nominal interval. A measuring counter, preferably a modulo-8 counter, in particular the sample counter, may be used for measuring the interval between the edges.

To increase the exactitude of the measurement, inaccuracies, e.g., because of the EMC influence and the time-discretization error, are taken into account. The time-discretization error is, let us say, one sample clock (so-called sampling period). Moreover, communication controller 24 has a device for carrying the method of example embodiments of the present invention into effect.

What is claimed is:

1. A method for decoding a signal transmitted via at least one connecting line of a data transmission system in a user of the data transmission system receiving the signal, the data transmission system including a plurality of users having connecting lines between the users, comprising:
    transmitting data coded in the signal in data frames having a defined structure, the data being transmitted serially bit-by-bit;
    sampling each bit in the receiving user using a plurality of clock pulses; and
    predefining, within a data frame, synchronization points for reference of an instant of a sampling for each received bit; and
    measuring an interval of a change, provided compulsorily in a transmission protocol used in the data transmission system, of the signal one of (a) from rising to falling and (b) from falling to rising edge;
    calculating a value of the asymmetrical delay of the transmitted signal as a difference between an actual length of the measured interval and a specified length for the measured interval; and
    executing suitable measures for improving the sampling of the received bits as a function of the calculated value of the asymmetrical delay of the transmitted signal.

2. The method according to claim 1, wherein the interval between a rising edge of a frame start sequence and a falling edge of a byte start sequence of a data frame is measured.

3. The method according to claim 1, wherein a measuring counter is started with one of (a) a rising and (b) a falling edge of the signal, and the measuring counter is stopped with one of (a) the falling and (b) the rising edge of the signal, the counter reading being utilized as a measure for the measured interval.

4. The method according to claim 3, wherein a sample counter is employed as measuring counter, which is used for ascertaining the sampling instant set and for triggering the sampling at the sampling instant.

5. The method according to claim 1, wherein to improve the sampling of the received bits, a sampling instant of at least one of the received bits is set in variable fashion to vary from a sampling instant set by a respective at least one of the plurality of clock pulses.

6. The method according to claim 5, wherein the variable sampling instant is set in variable fashion for each data frame received.

7. The method according to claim 5, wherein a correction value for a stipulated nominal sampling instant is ascertained as a function of the calculated value of the asymmetrical delay of the transmitted signal, the nominal sampling instant, corrected by the correction value, being utilized as the variable sampling instant set.

8. The method according to claim 1, wherein the calculated value of the asymmetrical delay of the transmitted signal is utilized to detect at least one of a faulty transmission activity of a transmitting user, a faulty receive activity of a receiving user and a defect in the at least one connecting line of the data transmission system.

9. A method for decoding a signal transmitted via at least one connecting line of a data transmission system in a user of the data transmission system receiving the signal, the data transmission system including a plurality of users having connecting lines between the users, comprising:
    transmitting data coded in the signal in data frames having a defined structure, the data being transmitted serially bit-by-bit;
    sampling each bit in the receiving user using a plurality of clock pulses; and
    predefining, within a data frame, synchronization points for reference of an instant of a sampling for each received bit; and
    measuring an interval of a change, provided compulsorily in a transmission protocol used in the data transmission system, of the signal one of (a) from rising to falling and (b) from falling to rising edge;
    wherein suitable measures for improving the sampling of the received bits are taken as a function of one of (a) the measured interval and (b) an ascertained asymmetrical delay of the transmitted signal,
    wherein to improve the sampling of the received bits, instants for sampling the received bits are set in variable fashion, and
    wherein given an n-fold oversampling of a received bit, the variable sampling instant is ascertained based on the following equation:

$$t\_var = t\_nom - (y-n)/a,$$

t_nom being the nominal sampling instant, y being the counter reading of a measuring counter and a being the number of bits over which the asymmetrical delay is measured.

10. A system for transmitting a signal, comprising:
    a plurality of users which are connected to each other via connecting lines for signal transmission;
    a device configured to transmit data, coded in the signal, in data frames having a defined structure, and to serially transmit the data bit-by-bit, at least one user receiving the signal including a device configured to sample each bit using a plurality of clock pulses, and within a data frame, synchronization points for reference of an instant of a sampling being predefined for each received bit;
    wherein the at least one user receiving the signal includes a device configured to:
        measure the interval of a change, provided compulsorily in a transmission protocol, of the signal from one of (a) rising to falling and (b) falling to rising edge,
        calculate a value of the asymmetrical delay of the transmitted signal as a difference between an actual length of the measured interval and a specified length for the measured interval, and execute suitable measures for improving the sampling of the received bits as a function of the calculated value of the asymmetrical delay of the transmitted signal.

11. A user of a data transmission system, the system including the user and at least one further user connected to each other via connecting lines for signal transmission, and including a device configured to transmit data, coded in the signal, in data frames having a defined structure and to serially transmit the data bit-by-bit, the user comprising:
  a device configured to sample each bit using a plurality of clock pulses, and within a data frame, synchronization points for reference of an instant of a sampling being predefined for each received bit, and
  a device configured to:
    measure an interval of a change, provided compulsorily in a transmission protocol, of the signal one of (a) from rising to falling and (b) from falling to rising edge,
    calculate a value of the asymmetrical delay of the transmitted signal as a difference between an actual length of the measured interval and a specified length for the measured interval, and
    execute suitable measures for improving the sampling of the received bits as a function of the calculated value of the asymmetrical delay of the transmitted signal.

12. A communication controller of a user of a data transmission system, the system including a plurality of users which are connected to each other via connecting lines for signal transmission, and including a device configured to transmit data, coded in the signal, in data frames with a defined structure and to serially transmit the data bit-by-bit, comprising:
  a communication controller arrangement configured to sample each bit using a plurality of clock pulses, and within a data frame, synchronization points for reference of an instant of a sampling being predefined for each received bit, the communication controller including a device configured to:
    measure an interval of a change, provided compulsorily in a transmission protocol, of the signal one of (a) from rising to falling and (b) from falling to rising edge;
    calculate a value of the asymmetrical delay of the transmitted signal as a difference between an actual length of the measured interval and a specified length for the measured interval, and
    execute suitable measures for improving the sampling of the received bits as a function of the calculated value of the asymmetrical delay of the transmitted signal.

13. A communication controller of a user of a data transmission system, the system including a plurality of users which are connected to each other via connecting lines for signal transmission, and including a device configured to transmit data, coded in the signal, in data frames with a defined structure and to serially transmit the data bit-by-bit, comprising:
  a communication controller arrangement configured to sample each bit using a plurality of clock pulses, and within a data frame, synchronization points for reference of an instant of a sampling being predefined for each received bit, the communication controller including a device configured to measure an interval of a change, provided compulsorily in a transmission protocol, of the signal one of (a) from rising to falling and (b) from falling to rising edge;
  wherein a tendency of the asymmetrical delay is ascertained from the measured interval, and
  wherein suitable measures for improving the sampling of the received bits are taken as a function of one of (a) the measured interval and (b) an ascertained asymmetrical delay of the transmitted signal,
  wherein to improve the sampling of the received bits, instants for sampling the received bits are set in variable fashion, and wherein given an n-fold oversampling of a received bit, the variable sampling instant is ascertained based on the following equation:

$$t\_var = t\_nom - (y-n)/a,$$

t_nom being the nominal sampling instant, y being the counter reading of the measuring counter and a being the number of bits over which the asymmetrical delay is measured.

14. A system for transmitting a signal, comprising:
  a plurality of users which are connected to each other via connecting lines for signal transmission;
  a device configured to transmit data, coded in the signal, in data frames having a defined structure, and to serially transmit the data bit-by-bit, at least one user receiving the signal including a device configured to sample each bit using a plurality of clock pulses, and within a data frame, synchronization points for reference of an instant of a sampling being predefined for each received bit;
  wherein the at least one user receiving the signal includes a device configured to measure the interval of a change, provided compulsorily in a transmission protocol, of the signal from one of (a) rising to falling and (b) falling to rising edge, and
  wherein a tendency of the asymmetrical delay is ascertained from the measured interval,
  wherein suitable measures for improving the sampling of the received bits are taken as a function of one of (a) the measured interval and (b) an ascertained asymmetrical delay of the transmitted signal, and
  wherein to improve the sampling of the received bits, instants for sampling the received bits are set in variable fashion, and wherein given an n-fold oversampling of a received bit, the variable sampling instant is ascertained based on the following equation:

$$t\_var = t\_nom - (y-n)/a,$$

t_nom being the nominal sampling instant, y being the counter reading of the measuring counter and a being the number of bits over which the asymmetrical delay is measured.

15. A user of a data transmission system, the system including the user and at least one further user connected to each other via connecting lines for signal transmission, and including a device configured to transmit data, coded in the signal, in data frames having a defined structure and to serially transmit the data bit-by-bit, the user comprising:
  a device configured to sample each bit using a plurality of clock pulses, and within a data frame, synchronization points for reference of an instant of a sampling being predefined for each received bit,
  wherein the user includes a device configured to measure an interval of a change, provided compulsorily in a transmission protocol, of the signal one of (a) from rising to falling and (b) from falling to rising edge, and
  wherein a tendency of the asymmetrical delay is ascertained from the measured interval, and
  wherein suitable measures for improving the sampling of the received bits are taken as a function of one of (a) the measured interval and (b) an ascertained asymmetrical delay of the transmitted signal, wherein to improve the sampling of the received bits, instants for sampling the received bits are set in variable fashion, and wherein given an n-fold oversampling of a received bit, the variable sampling instant is ascertained based on the following equation:

$$t\_var = t\_nom - (y-n)/a,$$

t_nom being the nominal sampling instant, y being the counter reading of the measuring counter and a being the number of bits over which the asymmetrical delay is measured.

* * * * *